UNITED STATES PATENT OFFICE.

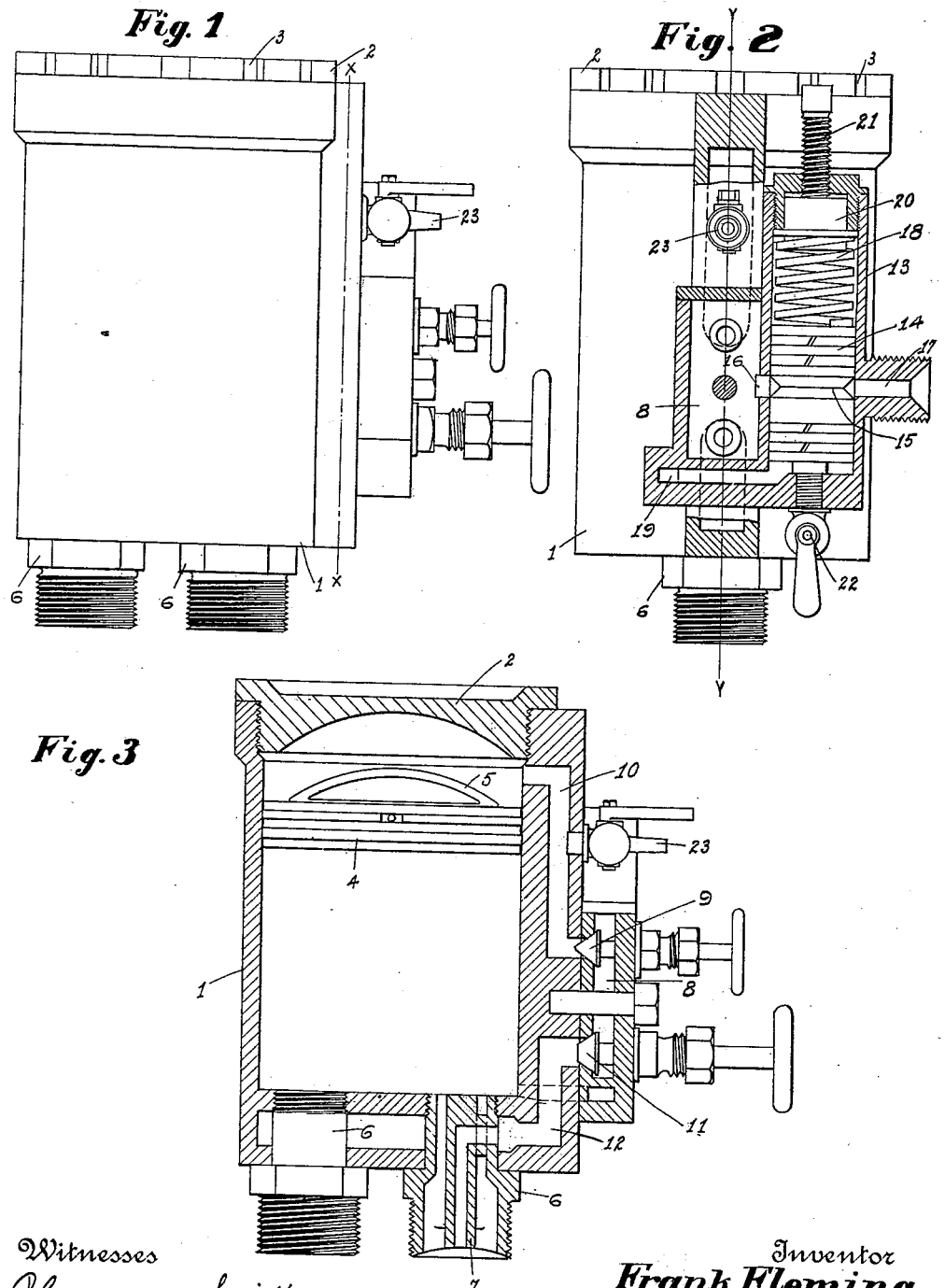

FRANK FLEMING, OF SACRAMENTO, CALIFORNIA.

FLUID-PRESSURE-OPERATED LUBRICANT-CUP.

1,104,178. Specification of Letters Patent. Patented July 21, 1914.

Original application filed January 13, 1912, Serial No. 671,054. Divided and this application filed May 21, 1912. Serial No. 698,809.

*To all whom it may concern:*

Be it known that I, FRANK FLEMING, a citizen of the United States, residing at Sacramento, in the county of Sacramento, State of California, have invented certain new and useful Improvements in Fluid-Pressure-Operated Lubricant-Cups; and I do declare the following to be a clear, full, and exact description of the same.

This invention relates to improvements in lubricators, and particularly to a lubricant cup for the same, the object of the invention being to produce a lubricant cup for the use of grease, oil or other lubricants whereby the said lubricant may be placed under fluid pressure for the purpose of forcing the same through any desired system of pipe lines or other lubricant conveying means.

A further object of the invention is to produce an automatic feature of control for controlling the amount of lubricant leaving the cup and also for controlling the fluid pressure.

A further object of the invention is to produce a simple and inexpensive device and yet one which will be exceedingly effective for the purposes for which it is designed.

The subject matter of this application was originally disclosed in my application, Ser. No. 671,054, dated January 13th, 1912, this application being a divisional application from that above named.

The above objects, I accomplish by means of such structure and relative arrangement of the parts as will fully appear by a perusal of the following specification and claims.

In the drawings similar characters of reference indicate corresponding parts in the several views.

Figure 1 is a side elevation of the complete device. Fig. 2 is a sectional view taken on a line X—X of Fig. 1. Fig. 3 is a sectional view taken relatively on a line Y—Y of Fig. 2.

Referring now more particularly to the characters of reference on the drawings, I first provide a main reservoir 1 adapted to receive the lubricating oil or grease by a removable screw cap 2 provided with suitable recesses 3 to receive a wrench or other similar tool.

Within the reservoir 10 is a movable piston 4 provided with a handle 5 for the purpose of lifting it from the reservoir 1 when it is desired to fill said reservoir with lubricant. Leading from said reservoir 1 is a pipe line of any desired type but preferably of an outer pipe 6 communicating directly with said reservoir 1 and provided with an interior pipe 7 adapted to communicate with a suitable steam supply valve coöperatively connected with said reservoir 1 in a manner as will hereinafter appear.

The numeral 8 designates a steam passageway, while 9 is a valve connected between said passageway 8 and another passageway 10 leading to and communicating with the top of the reservoir 1 above the piston 4, whereby the pressure can be applied to the lubricant to force it through the pipes 6.

The numeral 11 designates another valve leading from the passageway 8 into another passageway 12 communicating with the pipe 7 whereby steam may be passed through the pipe 7 to keep the grease or oil in the pipe 6 warm so that it will flow freely at all times.

In order to prevent too much lubricant being forced in the pipe 6, I provide the following control mechanism in combination with the reservoir 1, which control mechanism is substantially as set forth hereinafter, to-wit: Connecting with the steam passageway 8 is a cylinder 13 having a piston 14 movable therein. Such piston 14 is provided with an annular groove 15 in its sides, such groove being adapted to be normally in register with a passageway 16 in the side of and communicating with the passageway 8. Under normal conditions the steam then passes from the inlet 17, through the groove 15 and passageway 8, passageway 10 and to the top of the piston 14. This normal condition of the piston 14 is maintained by a spring 18 interposed between the piston 14 and the top of the cylinder 13, which spring is just the proper tension to hold such piston 14 in its normal position aforesaid. When however a greater pressure than is desired is exerted against the piston 14 which would congest all the pipes 6 with the lubricant, then said lubricant is forced through a passageway 19 and into the cylinder 13 against the underside of the piston 14 forcing said piston 14 upwardly against the spring 18. This action moves the said piston 14 in such a position that the groove 15 moves out of register with the passageways 16 and 17, thus shutting the steam off from the passageway 8 and thus relieving the pressure on the top of the piston 4. This operation then prevents too much lubricant being forced through the pipes 6.

The tension of the spring 18 is regulated by a collar 20 movable in the cylinder 13 against said spring 18 and being operated by a set screw 21. The numeral 22 designates a draw off cock from the cylinder 13, while the numeral 23 designates a smaller cock connected with the passageway 8.

As will be readily seen by operating the valve 9 the pressure may be applied to the top of the piston 4 to force the grease through the pipe 6 and thereafter the same will be automatically controlled. Also a further adjustment can be had by the operation of the valve 9. The steam passing through the passageway 12 to the pipe 7 may be controlled by the valve 11.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising a reservoir, a reciprocating member disposed in said reservoir, a valve controlled steam passage way mounted on the side of said reservoir, a plurality of pipes communicating with said steam passage way, and means for applying fluid pressure against said reciprocating member, as described.

2. A device of the character described comprising a reservoir a reciprocating piston disposed in said reservoir, said reservoir being provided with a passage way communicating with the top thereof above said piston a cylindrical member disposed on the side of said reservoir and provided with a spring pressed piston, said cylindrical member, said reservoir, and said piston each being provided with a passage way, all of which are normally in communication with each other and with the first named passage way in said reservoir, said reservoir being provided with a passage way below said piston communicating with said cylindrical member below the piston in said cylindrical member as described.

3. A device of the character described comprising a reservoir, a reciprocating member disposed in said reservoir, said reservoir being provided with a passage way communicating from the outside of said reservoir to the inside thereof above said reciprocating member, a cylindrical member disposed on the side of said reservoir and provided with a spring pressed piston, said cylindrical member, said reservoir and said piston each being provided with a passage way all of which are normally in communication with each other and with said first named passage way, said reservoir being provided with a passage way below said reciprocating member and communicating with said cylindrical member below the piston in said cylindrical member, as described.

In testimony whereof I affix my signature in presence of two witnesses.

FRANK FLEMING.

Witnesses:
STEPHEN N. BLEWETT,
PERCY S. WEBSTER.